United States Patent
Naganuma (10) Patent No.: US 8,580,449 B2
(45) Date of Patent: Nov. 12, 2013

(54) FUEL CELL SYSTEM AND POWER SUPPLY CONTROL METHOD

(75) Inventor: Yoshiaki Naganuma, Nissin (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 640 days.

(21) Appl. No.: 12/594,526

(22) PCT Filed: Apr. 18, 2008

(86) PCT No.: PCT/JP2008/057997
§ 371 (c)(1),
(2), (4) Date: Oct. 2, 2009

(87) PCT Pub. No.: WO2008/133318
PCT Pub. Date: Nov. 6, 2008

(65) Prior Publication Data
US 2010/0068574 A1  Mar. 18, 2010

(30) Foreign Application Priority Data
Apr. 19, 2007  (JP) .................................. 2007-110355

(51) Int. Cl.
*H01M 8/04*  (2006.01)

(52) U.S. Cl.
USPC .......................................... 429/432; 429/444

(58) Field of Classification Search
USPC .................. 429/430, 401, 400, 479, 432, 444
See application file for complete search history.

(56) References Cited

U.S. PATENT DOCUMENTS 5,156,928 A * 10/1992 Takabayashi ................. 429/431
6,461,751 B1 * 10/2002 Boehm et al. ................. 429/432
2005/0048336 A1 * 3/2005 Takebe et al. .................. 429/22
2007/0054165 A1 * 3/2007 Yoshida et al. ................. 429/23
2007/0077469 A1 * 4/2007 Fukuda et al. .................. 429/24

FOREIGN PATENT DOCUMENTS

| DE | 10-2006-026 238 A1 | 12/2006 |
|---|---|---|
| JP | 07-14599 A | 1/1995 |
| JP | 2004-030979 A | 1/2004 |
| JP | 2004-273162 A | 9/2004 |
| JP | 2004273162 A * | 9/2004 |
| JP | 2005-038691 A | 2/2005 |
| JP | 2006-073501 A | 3/2006 |
| JP | 2007-027047 A | 2/2007 |
| WO | WO 2007/046545 A1 | 4/2007 |

OTHER PUBLICATIONS

Machine Translation of: JP 2004/273162 A, Ino, Takashi, Sep. 2004.*
Abstract of: JP 2004/273162 A, Ino, Takashi, Sep. 2004.*

* cited by examiner

*Primary Examiner* — Kenneth Douyette
(74) *Attorney, Agent, or Firm* — Kenyon & Kenyon LLP (57) ABSTRACT

In order to determine the air stoichiometric ratio without using multidimensional mapping, a fuel cell system of the invention computes a command current value and command voltage value in a fuel cell during low-efficiency electrical power generation based on the required electrical power, estimates a reference voltage of the fuel cell from the command voltage value and the water temperature when the command current value is taken as a reference current, determines the difference between the reference voltage thus obtained and the command voltage value as an air concentration overvoltage target value, computes the air stoichiometric ratio based on the air concentration overvoltage target value, computes the air amount during low-efficiency electrical power generation based on the air stoichiometric ratio, and controls the amount of air supplied to the fuel cell according to the air amount thus computed.

8 Claims, 6 Drawing Sheets

FUEL CELL SYSTEM AND POWER SUPPLY CONTROL METHOD

This is a 371 national phase application of PCT/JP2008/057997 filed 18 Apr. 2008, which claims priority to Japanese Patent Application No. 2007-110355 filed 19 Apr. 2007, the contents of which are incorporated herein by reference.

CROSS-REFERENCES

1. Technical Field

This invention relates to a fuel cell system comprising a fuel cell, which generates electrical energy through an electrochemical reaction between hydrogen and oxygen, and in particular relates to an air amount estimation computation during low-efficiency operation at startup.

2. Background

Fuel cells which generate electricity utilizing an electrochemical reaction between hydrogen and oxygen include, for example, polymer electrolyte fuel cells. Such polymer electrolyte fuel cells comprise a stack in which a plurality of cells are stacked. A cell comprised by the stack comprises an anode (fuel electrode) and a cathode (air electrode); between the anode and the cathode is inserted a solid polymer electrolyte membrane, having sulfonic groups serving as ion exchange groups.

A fuel gas (reformed hydrogen obtained by reforming hydrogen gas or a hydrocarbon gas to make it hydrogen-rich) is supplied to the anode, and gas comprising oxygen as an oxidizing agent (an oxidizing gas) is supplied to the cathode; as one example, air is supplied. By supplying a fuel gas to the anode, the hydrogen comprised by the fuel gas reacts with a catalyst in a catalyst layer comprised by the anode, and by this means hydrogen ions are generated. The hydrogen ions thus generated pass through the solid polymer electrolyte membrane, causing an electrochemical reaction with oxygen at the cathode. By means of this electrochemical reaction, electric power is generated.

In a fuel cell system, at the time of low-temperature startup, water remaining within the fuel cell when the fuel cell was last stopped may have frozen, so that startup is not possible. Or, even when startup is possible, water generated through the reaction of the fuel cell itself may freeze, halting electric power generation.

Hence as for example disclosed in Japanese Patent Application Laid-open No. 2004-30979, at the time of startup the amount of air supplied to the fuel cell may be set to be lower than the amount supplied during normal electric power generation, and control may be executed to increase the amount of heat generated by the fuel cell itself through oxygen deficiency. At this time, if the amount of reaction gas supplied is decreased, and control executed so that the voltage of the fuel cell is close to 0 V, a reverse potential may appear across the cell. Because the current value at which a reverse potential does not occur changes with the temperature of the fuel cell, as described for example in Japanese Patent Application Laid-open No. 2006-73501, the oxygen supply amount necessary to cause operation of the fuel cell at a potential at which a reverse potential does not occur, and the temperature of the fuel cell, may be associated and mapped in advance, and the amount of oxygen supplied may be decided based on the temperature of the fuel cell.

SUMMARY

When decreasing the amount of reaction gas supplied to perform low-efficiency electric power generation and raise the temperature of the fuel cell, in order to decide the air stoichiometric ratio (the ratio when the minimum amount of air necessary for power generation of the fuel cell is 1), the effects of the fuel cell temperature, water content, and similar must be considered. However, in order to decide the air stoichiometric ratio taking into consideration the effects of the fuel cell temperature, water content, and similar, multidimensional mapping is necessary, and so the memory capacity of the electronic control unit (ECU) for multidimensional mapping must be increased. Further, computations using multidimensional mapping generally have poor numerical compatibility and tend to result in poorer estimation precision, so that there has been the possibility of the occurrence of errors in estimations of power and of the amount of fuel gas required.

Hence an object of this invention is to provide a fuel cell system which can precisely decide the air stoichiometric ratio in a fuel cell during low-efficiency electrical power generation without using multidimensional mapping.

In order to attain this object, a fuel cell system of this invention which performs low-efficiency electrical power generation is characterized by having a command value computation portion, which computes a command current value and command voltage value for the fuel cell during low-efficiency electrical power generation; an air concentration overvoltage target value computation portion, which estimates a reference voltage for the fuel cell when the command current value is taken to be a reference current, and computes the difference between the reference voltage and the command voltage value as an air concentration overvoltage target value; an air stoichiometric ratio computation portion, which computes the air stoichiometric ratio based on the air concentration overvoltage target value; and an air amount computation portion, which computes the air amount during low-efficiency electrical power generation, based on the air stoichiometric ratio.

By means of this configuration, when deciding the air stoichiometric ratio such that the command current value and command voltage value for the fuel cell during low-efficiency electrical power generation are satisfied, the command current value is taken to be a reference current, a reference voltage for the fuel cell is estimated, the difference between the estimated reference voltage and the command voltage value is determined as an air concentration overvoltage target value, based on this air concentration overvoltage target value the air stoichiometric ratio is computed, and based on the air stoichiometric ratio computed in this way the air amount during low-efficiency electrical power generation is determined, so that the air stoichiometric ratio can be determined without using multidimensional mapping. Consequently the memory capacity can be reduced and multidimensional mapping is not used, so that the precision of the air stoichiometric ratio thus determined can be increased.

That is, when determining an air stoichiometric ratio which satisfies the command current value and command voltage value, the fuel cell reference voltage when the command current value is taken as a reference current is estimated, and the difference between this estimated reference voltage and the command voltage value is determined as an air concentration overvoltage target value, so that the air stoichiometric ratio can be determined based on this air concentration overvoltage target value, and the air stoichiometric ratio can be decided without using multidimensional mapping. At this time, the reference voltage is estimated taking the fuel cell temperature and water content into consideration, so that the air stoichiometric ratio can be determined accurately with the fuel cell temperature and water content taken into consideration.

In configuring this fuel cell system, the following elements can be added.

It is preferable that the air concentration overvoltage target value computation portion detect a temperature of the fuel cell, and estimate the reference voltage from the detected temperature and the command current value.

By means of this configuration, the temperature of the fuel cell is detected, and the reference voltage is estimated from the detected temperature and the command current value, so that the air stoichiometric ratio can be determined with still higher precision, taking into account the effect of the fuel cell temperature.

It is preferable that the air concentration overvoltage target value computation portion estimate an impedance of the fuel cell, and estimate the reference voltage from the estimated impedance and the command current value.

By means of this configuration, the impedance of the fuel cell is estimated, and the reference voltage is estimated from the estimated impedance and the command current value, so that the reference voltage corresponding to the water content can be determined, and the air stoichiometric ratio can be determined with still higher precision, taking into account the effect of the water content of the fuel cell.

It is preferable that the air concentration overvoltage target value computation portion estimate an impedance of the fuel cell at the end of the previous operation, and estimate the reference voltage from the estimated impedance and the command current value.

By means of this configuration, the impedance of the fuel cell at the end of the previous operation is estimated, and the reference voltage is estimated from the estimated impedance and the command current value, so that the reference voltage corrected for the water content at the end of the previous operation and the temperature can be determined, and the air stoichiometric ratio can be determined with still higher precision, taking into account the effect of the water content of the fuel cell at the end of the previous operation and the temperature.

It is preferable that the air stoichiometric ratio computation portion further measure a water content of the fuel cell, and reference the measured water content to compute the air stoichiometric ratio.

By means of this configuration, the water content of the fuel cell is measured, and the measured water content is referenced to compute the air stoichiometric ratio, so that the air stoichiometric ratio can be determined more precisely, taking into account the effect of the water content of the fuel cell.

It is preferable that the air stoichiometric ratio computation portion compute the air stoichiometric ratio based on a one-dimensional mapping of the air concentration overvoltage target value and the air stoichiometric ratio.

By means of this configuration, a one-dimensional mapping prepared in advance by measuring characteristics can be referenced, and the air stoichiometric ratio can be easily determined from the air concentration overvoltage target value.

It is preferable that the air stoichiometric ratio computation portion compute the air stoichiometric ratio based on a two-dimensional mapping of the air concentration overvoltage target value, the measured water content of the fuel cell, and the air stoichiometric ratio.

By means of this configuration, the air stoichiometric ratio can be determined more precisely, including the effect of the water content.

A power supply control method of this invention is a power supply control method for a fuel cell system which performs low-efficiency electrical power generation, and is characterized by having:

1) a step of computing a command current value and a command voltage value for the fuel cell during low-efficiency electrical power generation;

2) a step of estimating a reference voltage for the fuel cell when the command current value is taken as a reference current;

3) a step of computing the difference between the reference voltage and the command voltage value as an air concentration overvoltage target value;

4) a step of computing an air stoichiometric ratio based on the air concentration overvoltage target value; and 5) a step of computing an air amount during low-efficiency electrical power generation, based on the air stoichiometric ratio.

DETAILED DESCRIPTION (Overall Configuration)

Figure 1:
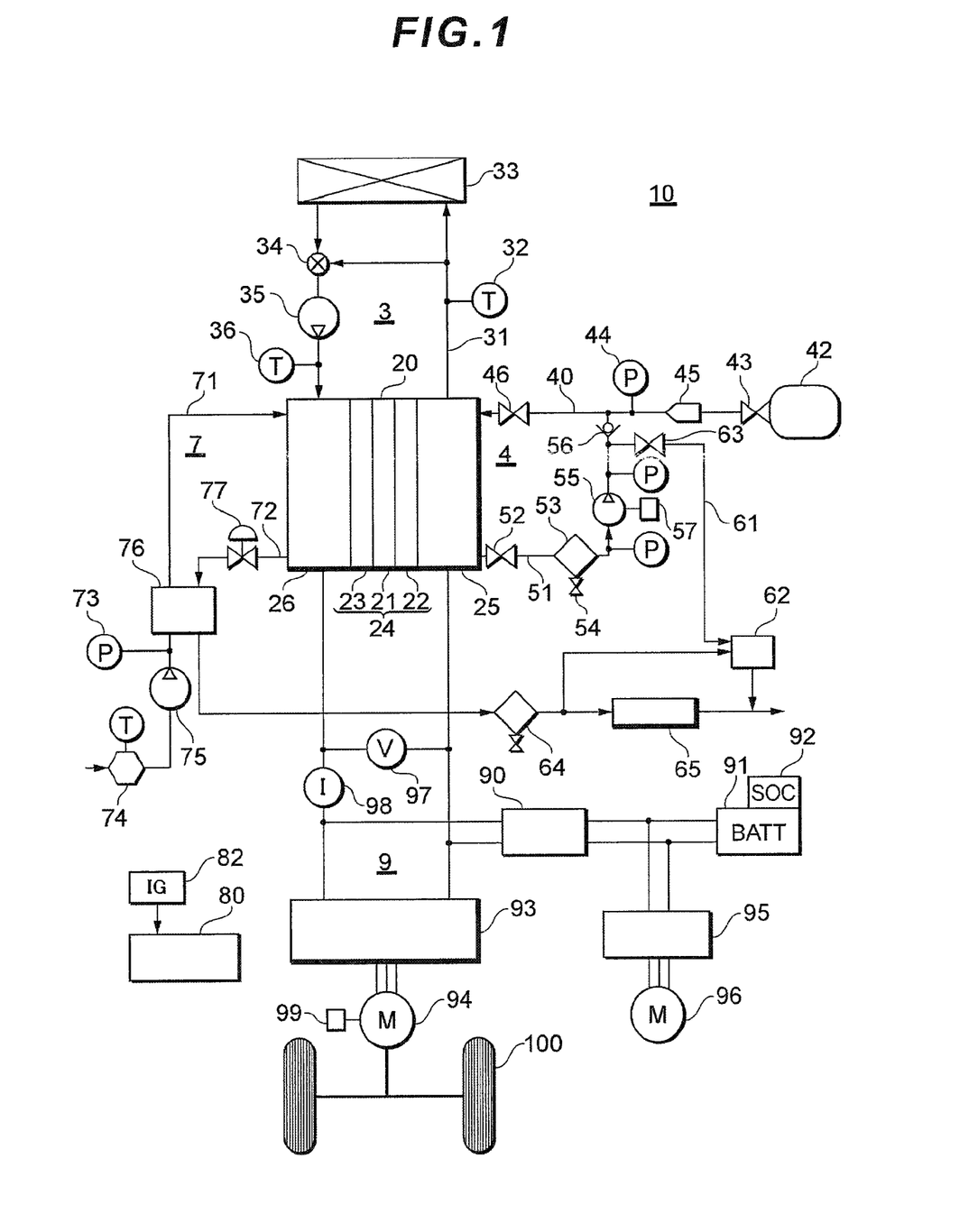
FIG. 1 is a system configuration diagram of a fuel cell system of the invention.

FIG. 1 is a system configuration diagram of a fuel cell system to which this invention is applied.

In FIG. 1, the fuel cell system 10 is configured comprising a fuel gas supply system 4, to supply fuel gas (hydrogen gas) to the fuel cell 20; an oxidizing gas supply system 7, to supply oxidizing gas (air) to the fuel cell 20; a cooling liquid supply system 3, to cool the fuel cell 20; and an electrical power system 9, which is charged by and discharges electric power generated by the fuel cell 20.

The fuel cell 20 comprises a membrane-electrode joined member 24, in which screen printing or another method is used to form an anode 22 and cathode 23 on the two faces of a polymer electrolyte membrane 21, comprising a proton-conducting ion exchange membrane or similar, formed from a fluorine resin or similar. Both faces of the membrane-electrode joined member 24 are enclosed between separators (not shown), having flow paths for fuel gas, oxidizing gas, and cooling water. Between the separators and the anode 22 and cathode 23 are formed a groove-shape anode gas channel 25 and cathode gas channel 26. The anode 22 is formed by providing a catalyst layer for the fuel electrode a porous supporting layer; the cathode 23 is formed by providing a catalyst layer for the air electrode on a porous supporting layer. The catalyst layers of these electrodes are for example formed by adhesion of platinum particles.

At the anode 22, the following oxidation reaction (1) occurs, and at the cathode 23, the following reduction reaction (2) occurs. For the fuel cell 20 overall, the electromotive reaction (3) below occurs.

$$H_2 \rightarrow 2H^+ + 2e^- \tag{1}$$

$$(\tfrac{1}{2})O_2 + 2H^+ + 2e^- \rightarrow H_2O \tag{2}$$

$$H_2 + (\tfrac{1}{2})O_2 \rightarrow H_2O \tag{3}$$

In FIG. 1, for convenience of explanation the structure of a unit cell, comprising a membrane-electrode joined member 24, anode gas channel 25, and cathode gas channel 26, is shown schematically; in actuality, a plurality of unit cells (cell groups) are connected in series with the above-described separators intervening, in a stack structure.

In the cooling liquid supply system 3 of the fuel cell system 10 are provided a cooling path 31 to cause circulation of cooling liquid, a temperature sensor 32 to detect the temperature of the cooling liquid discharged from the fuel cell 20, a radiator (heat exchanger) 33 which externally dissipates heat of the cooling liquid, a valve 34 to adjust the amount of cooling liquid flowing into the radiator 33, a cooing liquid pump 35 to pressurize and cause circulation of the cooling liquid, and a temperature sensor 36 to detect the temperature of cooling liquid supplied to the fuel cell 20.

The fuel gas supply system 4 of the fuel cell system 10 is provided with a fuel gas flow path 40 to supply fuel gas (anode gas), for example hydrogen gas, from the fuel gas supply device 42 to the anode gas channel 25, and a circulation flow path (circulation path) 51 to circulate fuel off gas discharged from the anode gas channel 25 to the fuel gas flow path 40; the fuel gas circulation system comprises these gas flow paths.

The fuel gas flow path 40 comprises a shutoff valve (stop valve) 43 which controls the outflow of fuel gas from the fuel gas supply device 42, a pressure sensor 44 which detects the pressure of the fuel gas, an adjustment valve (injector) 45 which adjusts the fuel gas pressure in the circulation path 51, and a shutoff valve 46 which controls the supply of fuel gas to the fuel cell 20. The fuel gas supply device 42 comprises, for example, a high-pressure hydrogen tank, hydrogen storing alloy, reformer, and similar.

In the circulation flow path 51 are installed a shutoff valve 52 which controls the supply of fuel off gas from the fuel cell 20 to the circulation flow path 51; a gas-liquid separator 53 and discharge valve 54 which remove water comprised by the fuel off gas; a hydrogen pump (circulation pump) 55, which pressurizes fuel off gas which has undergone pressure losses on passing through the anode gas channel 25, raising the gas pressure to an appropriate pressure and causing circulation in the fuel gas flow path 40; and a backflow prevention valve 56 which prevents backflow of fuel gas in the fuel gas flow path 40 on the side of the circulation flow path 51. By using a motor to drive the hydrogen pump 55, fuel off gas resulting from driving of the hydrogen pump 55 merges with fuel gas supplied from the fuel gas supply device 42 in the fuel gas flow path 40, and is then supplied to the fuel cell 20 and reused. A rotation rate sensor 57 which detects the rotation rate of the hydrogen pump 55 is installed in the hydrogen pump 55.

Further, a discharge flow path 61 to discharge fuel off gas discharged from the fuel cell 20 outside the vehicle via a dilution unit (for example, a hydrogen concentration reduction device) 62, is provided branching from the circulation flow path 51. A purge valve 63 is installed in the discharge flow path 61, configured so as to enable discharge control of the fuel off gas. By opening and closing the purge valve 63, circulation within the fuel cell 20 can be repeated, fuel off gas the impurity concentration of which has increased can be discharged to the outside, and new fuel gas can be introduced to prevent declines in the cell voltage.

On the other hand, the oxidizing gas supply system 7 of the fuel cell system 10 is provided with an oxidizing gas flow path 71 to supply oxidizing gas (cathode gas) to the cathode gas channel 26, and a cathode off gas flow path 72 to discharge cathode off gas discharged from the cathode gas channel 26. In the oxidizing gas flow path 71 are set an air cleaner 74 which removes air from the atmosphere, and an air compressor 75 which pressurizes captured air and transports the pressurized air, as the oxidizing gas, to the cathode gas channel 26. In the air compressor 75 is installed a rotation rate sensor 73 which detects the rotation rate of the air compressor 75. A humidifier 76 which performs humidity exchange is provided between the oxidizing gas flow path 71 and the cathode off gas flow path 72. In the cathode off gas flow path 72 are provided an adjustment valve 77 to adjust the discharge pressure in the cathode off gas flow path 72, a gas-liquid separator 64, configured as an option, to remove water in the cathode off gas, and a muffler 65 to absorb the discharge sound of the cathode off gas. The cathode off gas discharged from the gas-liquid separator 64 is divided; one flow flows into the dilution unit 62 and is diluted by combination with fuel off gas remaining in the dilution unit 62. The other divided flow of cathode off gas is combined with the gas which has been subjected to sound absorption in the muffler 65 and combining and dilution in the dilution unit 62, and is discharged outside the vehicle.

The output terminal of a battery 91 is connected to the primary side of the electric power system 9 of the fuel cell system 10, and to the secondary side are connected a DC-DC converter 90 connected to the output terminal of the fuel cell 20, a battery 91 as a secondary battery which stores excess electrical energy, a battery computer 92 which monitors the charged state of the battery 91, an inverter 93 which supplies AC power to a motor for vehicle travel 94 which is the load or device driven by the fuel cell 20, an inverter 95 which supplies AC power to various high-voltage auxiliary devices 96 in the fuel cell system 10, a voltage sensor 97 which measures the output voltage of the fuel cell 20, and a current sensor 98 which measures the output current.

The DC-DC converter 90 voltage-converts excess electrical power of the fuel cell 20 or regenerated electrical power generated by braking operation of the motor for vehicle travel 94, and supplies a current to charge the battery 91. In order to supplement the deficiency in the electrical power generated by the fuel cell 20 with respect to the electrical power required by the motor for vehicle travel 94, the DC-DC converter 90 voltage-converts the discharge power from the battery 91 and outputs the power to the secondary side.

The inverters 93 and 95 convert a DC current into a three-phase AC current, and output the currents to the motor for vehicle travel 94 and the high-voltage auxiliary devices 96. A rotation rate sensor 99 which detects the rotation rate of the motor for vehicle travel 94 is installed in the motor 94. The motor 94 is mechanically coupled with wheels 100 via a differential, and the rotational power of the motor 94 can be converted into power propelling the vehicle.

The voltage sensor 97 and current sensor 98 are provided to measure the AC impedance, based on the amplitude and the phase relative to voltage of the current of an AC signal superposed by the electrical power system 9. The AC impedance corresponds to the water content of the fuel cell 20.

Further, a control portion 80 to control electric power generation by the fuel cell 12 is installed in the fuel cell system 10. The control portion 80 employs a general-purpose computer comprising, for example, a CPU (central processing unit), RAM, ROM, an interface circuit, and similar. The control portion 80 captures sensor signals from the temperature sensors 32 and 36, pressure sensor 44, and rotation rate sensors 57, 73, 99, as well as signals from the voltage sensor 97, current sensor 98, and an ignition switch 82, drives each of the motors according to the fuel cell operating state, such as for example the electrical power load, adjusts the rotation rates of the hydrogen pump 55 and air compressor 75, performs open/close control or adjusts the degree of opening of each of the valves, and similar.

Figure 2:
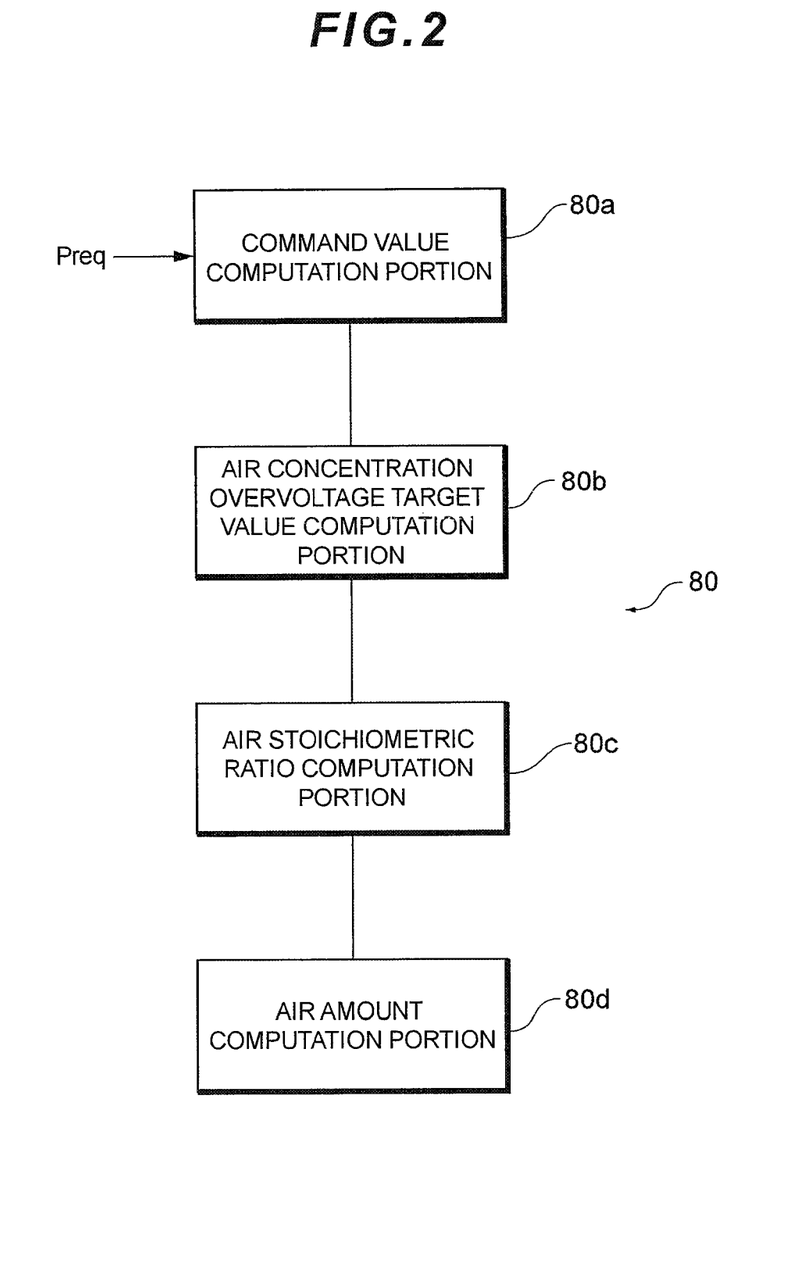
FIG. 2 is a functional block diagram used to explain functions of a control portion.

FIG. 2 shows a functional block diagram, realized through execution of a prescribed computer program by the control portion 80.

As shown in FIG. 2, the control portion 80 comprises a command value computation portion 80a, which, when lowering the amount of reaction gas supplied to the fuel cell 20 to perform low-efficiency electrical power generation, computes the command current value and command voltage value for the fuel cell 20 during low-efficiency electrical power generation, based on the electrical power Preq required of the fuel cell system 20; an air concentration overvoltage target value computation portion 80b, which estimates the reference voltage of the fuel cell 20 when the command current value obtained through computation by the command value computation portion 80a is taken to be the reference current, and computes, as the air concentration overvoltage target value, the difference between the estimated reference voltage and the command voltage value; an air stoichiometric ratio computation portion 80c, which, based on the air concentration overvoltage target value obtained through computation by the air concentration overvoltage target value computation portion 80b, computes the air stoichiometric ratio (the ratio when the minimum amount of air necessary for electric power generation by the fuel cell 20 is 1); and an air amount computation portion 80d, which, based on the air stoichiometric ratio obtained through computation by the air stoichiometric ratio computation portion 80c, computes the amount of air during low-efficiency electrical power generation.

(Embodiment 1)

In Embodiment 1, when estimating the reference voltage of the fuel cell 20 in the air concentration overvoltage target value computation portion 80b, the temperature sensors 32, 36 are used as water temperature sensors, and the reference voltage is estimated from the detected temperatures of the water temperature sensors and from the command current value.

However, as explained below, in addition the impedance of the fuel cell 20 can be estimated based on the current detected by the current sensor 98 and the voltage detected by the voltage sensor 97, and based on the estimated impedance and the command current value, a reference voltage corresponding to the impedance, that is, corresponding to the comprised water amount, can be estimated as the reference voltage of the fuel cell 20.

And, in the air concentration overvoltage target value computation portion 80b, when estimating the reference voltage of the fuel cell 20, the impedance of the fuel cell 20 at the end of the previous operation can be estimated based on the current detected by the current sensor 98 and the voltage detected by the voltage sensor 97, the fuel cell reference voltage can be estimated from the impedance thus estimated and from the command current value, and a reference voltage which is corrected for the water content at the end of the previous operation and for the temperature can be determined.

Figure 3:
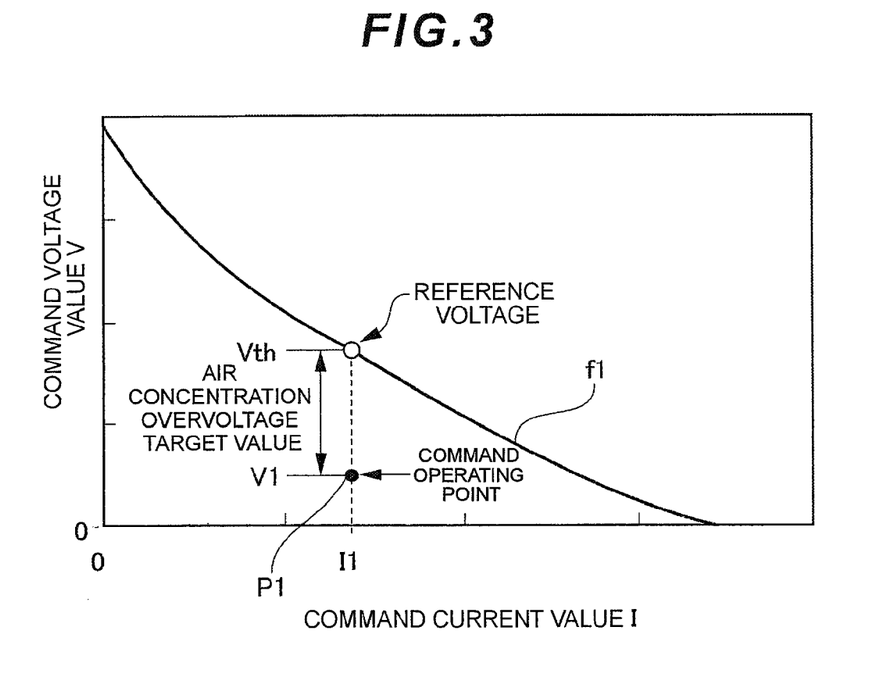
FIG. 3 is a reference I-V characteristic graph of a fuel cell, showing the relation between command current values and command voltage values.

FIG. 3 shows fuel cell I-V characteristics, which are the relation between the command current value and command voltage value.

In FIG. 3, the command operating point P1 determined from the command current value I1 and command voltage value V1 for the fuel cell during low-efficiency operation is shown. On the other hand, the reference I-V characteristic determined from the temperature during normal operation when the oxidizing gas (air) and fuel gas (hydrogen gas) are sufficient is shown as the curve f1. When taking the command current value as reference, the difference between the voltage V1 at the command operating point P1, and the reference voltage Vth on the curve f1 at the current I1 of the command operating point P1, is the "air concentration overvoltage target value".

When estimating the reference voltage of the fuel cell 20 with the command current value taken as the reference current, the air concentration overvoltage target value computation portion 80b computes the difference between the command voltage value V1 at the command operating point P1 determined from the command current value and the command voltage value, and the reference voltage Vth on the reference I-V characteristic curve f1, and outputs this difference as the air concentration overvoltage target value.

Figure 4:
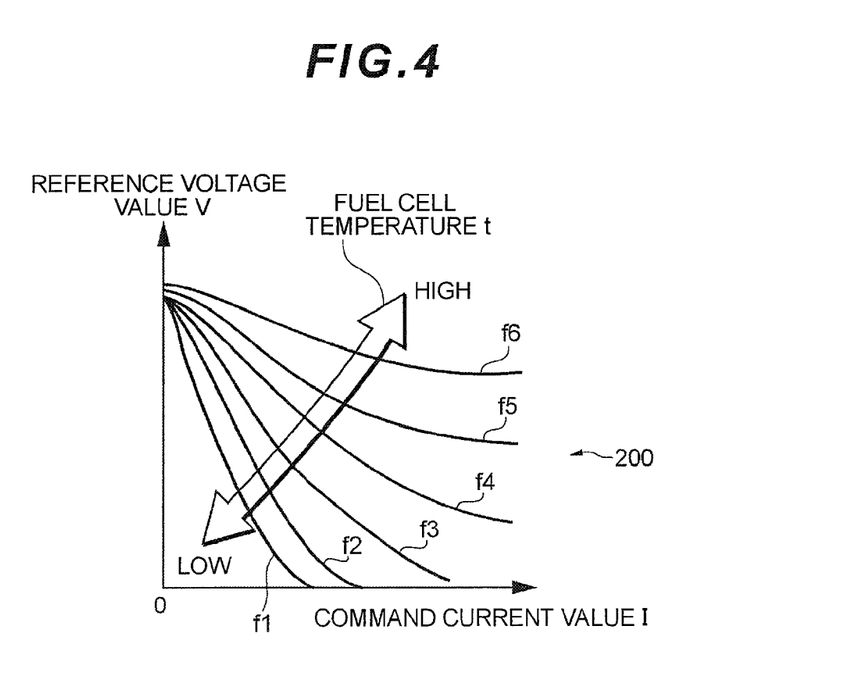
FIG. 4 shows the relation between reference I-V characteristics and the fuel cell temperature t.

FIG. 4 shows the relation between the reference I-V characteristic and the fuel cell temperature t.

As shown in FIG. 4, the reference I-V characteristic curve, indicating the relation between the current command value and the reference voltage value, changes with the temperature of the fuel cell 20. That is, the reference I-V characteristic curves f1 to f6, representing the relation between the current command value and the reference voltage value, change in such a manner that the characteristic conforms to the reference I-V characteristic curve f1 when the temperature of the fuel cell 20 is low, but as the temperature of the fuel cell 20 rises, changes to the reference I-V characteristic curves f2, f3, f4, f5, f6 representing reference voltage values Vth. The air concentration overvoltage target value computation portion 80b holds in advance, as a one-dimensional mapping; the relation between the fuel cell temperature t and the reference I-V characteristic curve, as shown in FIG. 4. When estimating the reference voltage from the command current value and the temperature of the fuel cell 20, the air concentration overvoltage target value computation portion 80b uses a mapping 200 representing the relation shown in FIG. 4 to compute the reference voltage value corresponding to the command current value, and from this calculates the air concentration overvoltage target value.

Figure 5:
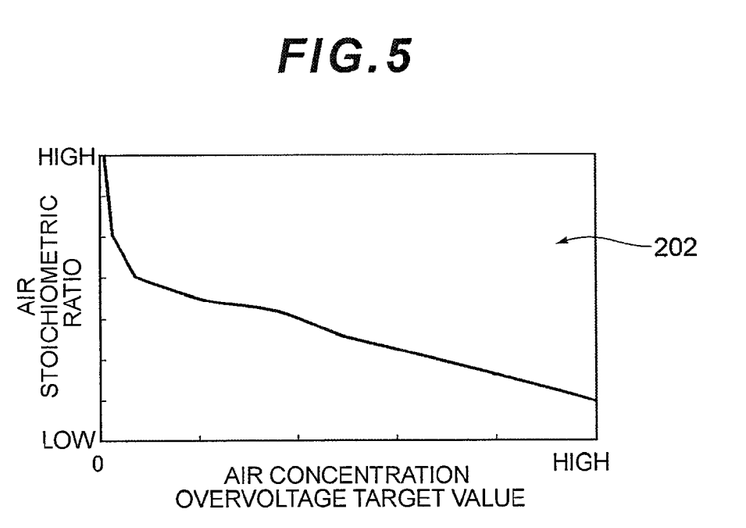
FIG. 5 shows the relation between the air concentration-target voltage value and the air stoichiometric ratio determined therefrom.
Figure 6:
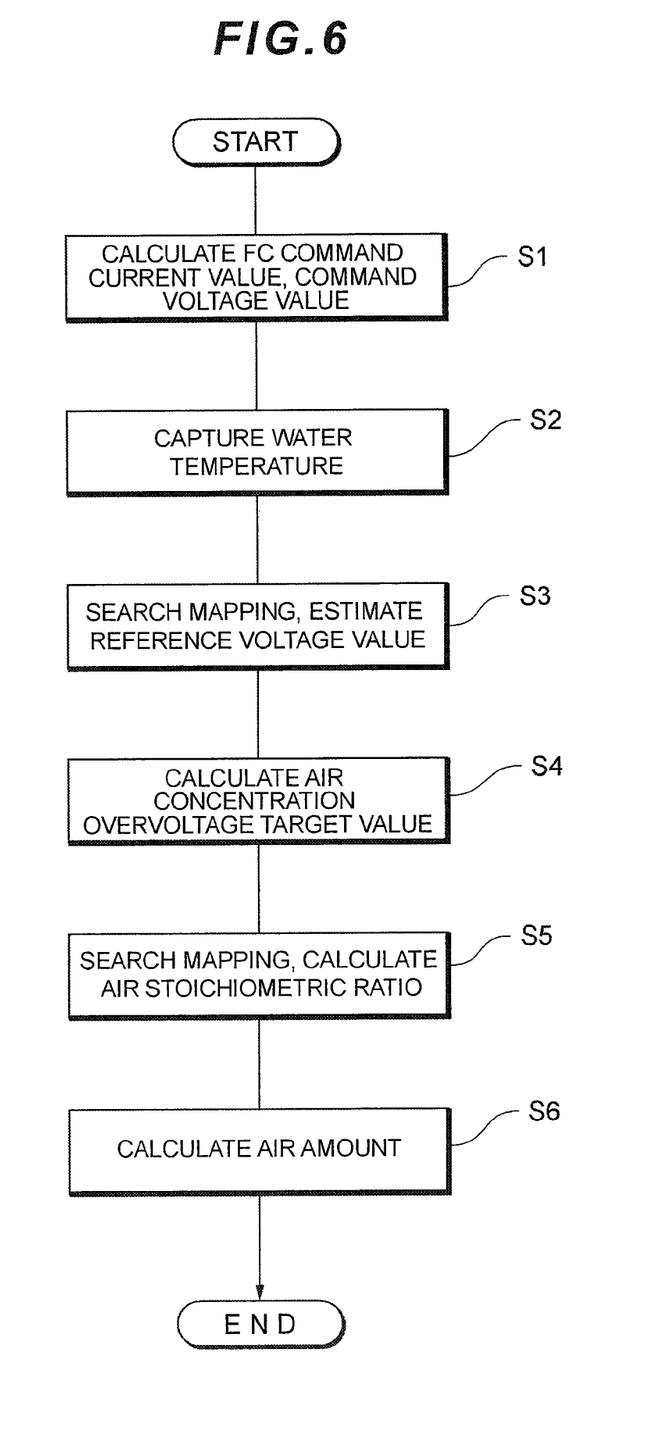
FIG. 6 is a flowchart used to explain action in Embodiment 1.

FIG. 5 shows the relation between the air concentration-target voltage value and the air stoichiometric ratio determined therefrom.

The air stoichiometric computation portion 80c holds in advance, as a one-dimensional mapping, the relation shown in FIG. 5. When calculating the air stoichiometric ratio based on the air concentration overvoltage target value, the air stoichiometric ratio computation portion 80c uses a reference voltage value mapping 202 representing the relation shown in FIG. 5, to compute the air stoichiometric ratio corresponding to the air concentration overvoltage target value.

Figure 7:
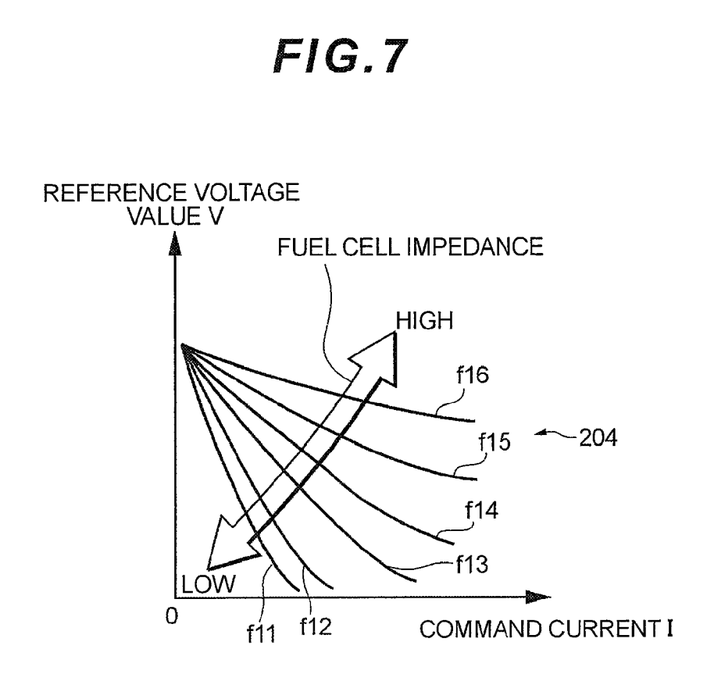
FIG. 7 shows the relation between reference I-V characteristics and impedance.

Next, action in Embodiment 1 is explained, referring to the flowchart of FIG. 7.

First, the command value computation portion 80a of the control portion 80 computes the command current value and command voltage value for the fuel cell 20, based on the electric power Preq required of the fuel cell system 10 performing low-efficiency electric power generation (S1). Next, the air concentration overvoltage target value computation portion 80*b* of the control portion 80 captures the detected temperatures (water temperature) of the temperature sensors 32 and 36 (S2), searches a reference voltage value mapping 200 representing the relation shown in FIG. 4 according to the detected temperature, the command current value and the command voltage value, and estimates the reference voltage value Vth (S3). Thereafter, the air concentration overvoltage target value computation portion 80*b* computes the difference between the estimated reference voltage value Vth and the command voltage value, as the air concentration overvoltage target value (S4).

Next, the air stoichiometric ratio computation portion 80*c* of the control portion 80 searches the reference voltage value mapping 202 representing the relation shown in FIG. 5, based on the calculated air concentration overvoltage target value, and determines the air stoichiometric ratio corresponding to the air concentration overvoltage target value (S5). Then, the air amount computation portion 80*d* of the control portion 80 calculates the air amount according to the air stoichiometric ratio thus determined, for example, according to the current value detected by the current sensor 98×a conversion coefficient×the air stoichiometric ratio (S6), after which the processing of this routine ends.

The control portion 80 drives the air compressor 75 according to the air amount determined through this processing, and the required amount of air is supplied to the fuel cell 20.

In the above, according to Embodiment 1, when estimating the reference voltage of the fuel cell 20 taking the command current value to be the reference current, the reference voltage is estimated based on the command current value and on the temperature of the fuel cell 20, so that the reference voltage corresponding to the temperature of the fuel cell 20 can be determined; in addition, the air stoichiometric ratio can be determined based on the air concentration overvoltage target value obtained from the difference between the reference voltage and the command voltage, and the memory capacity can be reduced. And because multidimensional mapping is not used, the air stoichiometric ratio can be determined with high precision.

(Embodiment 2)

Next, Embodiment 2 is explained. Embodiment 2 concerns an example of estimation of the air stoichiometric ratio based on the impedance of the fuel cell.

FIG. 7 shows the relation between reference I-V characteristics and impedance.

As shown in FIG. 7, similarly to the above-described case of the fuel cell temperature, the reference I-V characteristic is affected by and changes with the impedance of the fuel cell. The fuel cell impedance corresponds to the amount of water remaining in the fuel cell, that is, the water content of the fuel cell.

In Embodiment 2, the air concentration overvoltage target value computation portion 80*b* of the control portion 80 stores in advance the relation shown in FIG. 7 as a one-dimensional mapping. The air concentration overvoltage target value computation portion 80*b* measures the AC impedance of the fuel cell 20 based on the fuel cell voltage and current detected by the voltage sensor 97 and current sensor 98, and directly computes the air concentration overvoltage target value from the measured impedance.

That is, in place of the mapping 200 representing the relation shown in FIG. 4, the air concentration overvoltage target value computation portion 80*b* uses a reference voltage value mapping 204 such as shown in FIG. 7. Otherwise the configuration is similar to that in Embodiment 1. The characteristic curves f11 to f16 in the mapping 204 are such that the f11 is the characteristic for which the impedance is lowest, and as the impedance rises the characteristic becomes the characteristic curves f12 through f16.

Figure 8:
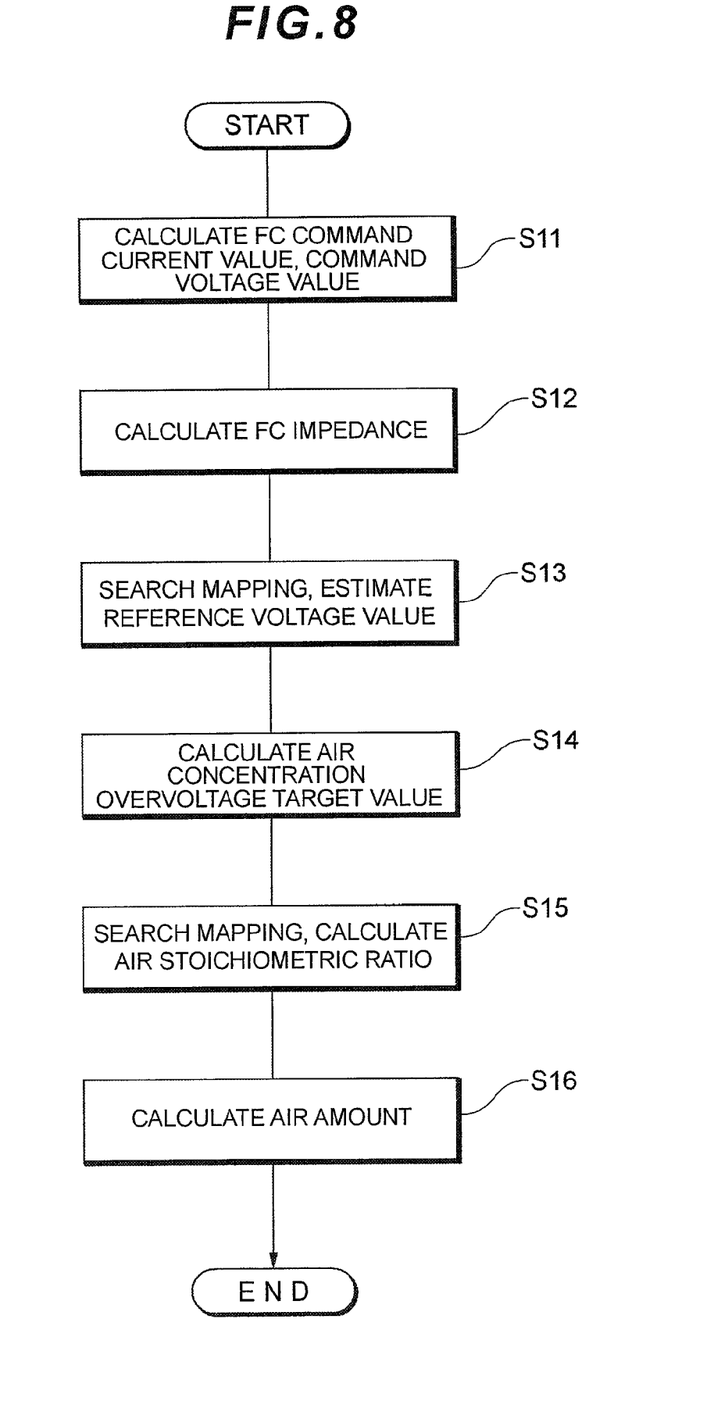
FIG. 8 is a flowchart used to explain action in Embodiment 2.

Next, action in Embodiment 2 is explained, referring to the flowchart of FIG. 8.

First, the command value computation portion 80*a* of the control portion 80 computes the command current value and command voltage value for the fuel cell 20, based on the electrical power Preq required of the fuel cell system 10 performing low-efficiency electric power generation (S11). Next, the air concentration overvoltage target value computation portion 80*b* of the control portion 80 calculates the impedance of the fuel cell 20 based on the current detected by the current sensor 98 and the voltage detected by the voltage sensor 97 (S12). And, the air concentration overvoltage target value computation portion 80*b* searches the reference voltage value mapping 204, which records a relation like that shown in FIG. 7, according to the calculated impedance and the command current value and command voltage value, and estimates the corresponding reference voltage value Vth (S13). And, the difference between the estimated reference voltage value and the command voltage value is computed as the air concentration overvoltage target value (S14).

Next, the air stoichiometric ratio computation portion 80*c* of the control portion 80 searches the mapping 202 shown in FIG. 5 based on the calculated air concentration overvoltage target value, and determines the air stoichiometric ratio corresponding to the air concentration overvoltage target value (S15). Then, the air amount computation portion 80*d* of the control portion 80 calculates the air amount according to the air stoichiometric ratio thus determined, for example, according to the current value detected by the current sensor 98×a conversion coefficient×the air stoichioemtric ratio (S16), after which the processing of this routine ends.

The control portion 80 drives the air compressor 75 according to the air amount determined through this processing, and the required amount of air is supplied to the fuel cell 20.

By means of Embodiment 2, when estimating the reference voltage of the fuel cell 20 taking the command current value to be the reference current, estimation is performed based on the command voltage value and the impedance of the fuel cell 20, so that the reference voltage corresponding to the impedance of the fuel cell 20 can be determined, the air stoichiometric ratio can be determined based on the air concentration overvoltage target value obtained from the difference between the reference voltage and the command voltage, and the memory capacity can be reduced. Also, because multidimensional mapping is not used, the air stoichiometric ratio can be determined with high precision.

MODIFIED EXAMPLE

This invention is not limited to the above embodiments, and can be applied with various modifications.

For example, in the above Embodiment 2, the impedance is measured in order to calculate the air concentration overvoltage target value, premised on computation of the air amount; instead, however, the impedance (water content) of the fuel cell 20 at the end of the previous operation can be estimated, and the reference voltage estimated from the impedance thus estimated and the command voltage value, to determine the reference voltage with corrections for the water content at the end of the previous operation and the temperature added. By using the previous impedance, there is no longer a need to measure the impedance solely to compute the air amount, and so highly precise computation of the air stoichiometric ratio utilizing the impedance, and accurate determination of the air supply amount, are possible.

Further, in the above embodiments, instead of using a mapping 202 representing the relation between the air concentration overvoltage target value and the air stoichiometric ratio, by adopting a configuration in which the water content of the fuel cell 20 is set by means of measurement of the impedance and the air stoichiometric ratio is determined from a two-dimensional mapping of the water content and the air concentration overvoltage target value, the air stoichiometric ratio can be determined more accurately, taking into account the effect of the water content of the fuel cell 20.

Industrial Applicability

By means of this invention, a reference voltage of a fuel cell is estimated taking a command current value as a reference current, the difference between the estimated reference voltage and a command voltage value is determined as an air concentration overvoltage target value, based on this air concentration overvoltage target value the air stoichiometric ratio is computed, and based on the air stoichiometric ratio obtained by computation the air amount during low-efficiency electrical power generation is determined; hence the air stoichiometric ratio can be determined with high precision, without using multidimensional mapping, and with the required memory capacity decreased.

I claim:

1. A fuel cell system, which performs low-efficiency electrical power generation that generates power by setting an air amount to be supplied with a fuel cell at an air amount that is less than an air amount during a normal drive operation, comprising:
    a command value computation portion programmed to compute a command current value and command voltage value for the fuel cell during low-efficiency electrical power generation based on a required power;
    an air concentration overvoltage target value computation portion programmed to estimate a reference voltage value for the fuel cell when the command current value is taken to be a reference current value based on a reference current—voltage characteristic defined in the normal drive operation, and compute the difference between the reference voltage value and the command voltage value as an air concentration overvoltage target value;
    an air stoichiometric ratio computation portion programmed to compute the air stoichiometric ratio based on a one-dimensional mapping of the air concentration overvoltage target value and the air stoichiometric ratio; and
    an air amount computation portion programmed to compute an air amount during the low-efficiency electrical power generation, based on the air stoichiometric ratio.

2. The fuel cell system according to claim 1, wherein the air concentration overvoltage target value computation portion is programmed to detect the temperature of the fuel cell, and estimate the reference voltage value from the detected temperature and the command current value.

3. The fuel cell system according to claim 1, wherein the air concentration overvoltage target value computation portion is programmed to estimate an impedance of the fuel cell, and estimate the reference voltage value from the estimated impedance and from the command current value.

4. The fuel cell system according to claim 1, wherein the air concentration overvoltage target value computation portion is programmed to estimate an impedance of the fuel cell at the end of the previous operation, and estimate the reference voltage value from the estimated impedance and from the command current value.

5. The fuel cell system according to claim 1, wherein the air stoichiometric ratio computation portion is further programmed to measure a water content of the fuel cell, and compute the air stoichiometric ratio referencing the measured water content.

6. A fuel cell system, which performs low-efficiency electrical power generation that generates power by setting an air amount to be supplied with a fuel cell at an air amount that is less than an air amount during a normal drive operation, comprising:
    a command value computation portion programmed to compute a command current value and command voltage value for the fuel cell during low-efficiency electrical power generation based on a required power;
    an air concentration overvoltage target value computation portion programmed to estimate a reference voltage value for the fuel cell when the command current value is taken to be a reference current value based on a reference current—voltage characteristic defined in the normal drive operation, and compute the difference between the reference voltage value and the command voltage value as an air concentration overvoltage target value;
    an air stoichiometric ratio computation portion programmed to compute the air stoichiometric ratio based on a two-dimensional mapping of the air concentration overvoltage target value, a measured water content of the fuel cell, and the air stoichiometric ratio; and
    an air amount computation portion programmed to compute an air amount during the low-efficiency electrical power generation, based on the air stoichiometric ratio.

7. A power supply control method for a fuel cell system which performs low-efficiency electrical power generation that generates power by setting an amount to be supplied with a fuel cell at an air amount that is less than an air amount during a normal drive operation, comprising:
    computing a command current value and a command voltage value for the fuel cell during low-efficiency electrical power generation based on a required power;
    estimating a reference voltage value for the fuel cell when the command current value is taken as a reference current value based on a reference current—voltage characteristic defined in the normal drive operation;
    computing the difference between the reference voltage value and the command voltage value as an air concentration overvoltage target value;
    computing an air stoichiometric ratio based on a one-dimensional mapping of the air concentration overvoltage target value and the air stoichiometric ratio; and
    computing an air amount during the low-efficiency electrical power generation, based on the air stoichiometric ratio.

8. A power supply control method for a fuel cell system which performs low-efficiency electrical power generation that generates an air amount to be supplied with a fuel cell at an air amount that is less than an air amount during a normal drive operation, comprising:
    computing a command current value and command voltage value for the fuel cell during low-efficiency electrical power generation based on a required power;
    estimating a reference voltage value for the fuel cell when the command current value is taken to be a reference current value based on a reference current—voltage characteristic defined in the normal drive operation, and compute the difference between the reference voltage value and the command voltage value as an air concentration overvoltage target value;

computing an air stoichiometric ratio based on a two-dimensional mapping of the air concentration overvoltage target value, a measured water content of the fuel cell, and the air stoichiometric ratio; and computing an air amount during the low-efficiency electrical power generation, based on the air stoichiometric ratio.

* * * * *